(12) United States Patent
Inselberg

(10) Patent No.: US 7,587,214 B2
(45) Date of Patent: *Sep. 8, 2009

(54) METHOD AND APPARATUS FOR INTERACTIVE PARTICIPATION AT A LIVE ENTERTAINMENT EVENT

(75) Inventor: Eric Inselberg, Short Hills, NJ (US)

(73) Assignee: Inselberg Interactive, LLC, Short Hills, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/725,759

(22) Filed: Mar. 20, 2007

(65) Prior Publication Data

US 2007/0197247 A1  Aug. 23, 2007

Related U.S. Application Data

(63) Continuation-in-part of application No. 11/300,208, filed on Dec. 14, 2005, now Pat. No. 7,248,888, which is a continuation-in-part of application No. 10/792,170, filed on Mar. 3, 2004, now Pat. No. 6,996,413, which is a continuation-in-part of application No. 10/378,582, filed on Mar. 5, 2003, now Pat. No. 6,760,595, which is a continuation-in-part of application No. 09/854,267, filed on May 11, 2001, now Pat. No. 6,650,903, which is a continuation of application No. 09/656,096, filed on Sep. 6, 2000, now Pat. No. 6,434,398.

(51) Int. Cl.
H04M 7/00 (2006.01)

(52) U.S. Cl. .................... 455/517; 455/414.1; 455/3.06

(58) Field of Classification Search ................ 455/66.1, 455/90.3, 575.6, 550.1, 414.1, 414.2, 416, 455/517; 463/36–42; 705/27, 37, 3; 725/9
See application file for complete search history.

(56) References Cited

U.S. PATENT DOCUMENTS

| 4,141,548 A | 2/1979 | Everton ................... 273/1 E |
| 4,496,148 A | 1/1985 | Morstain et al. ............ 273/1 E |
| 4,722,526 A | 2/1988 | Tovar et al. ................ 273/1 E |
| 5,213,337 A | 5/1993 | Sherman .................... 273/439 |
| 5,226,177 A | 7/1993 | Nickerson .................... 455/2 |
| 5,273,437 A | 12/1993 | Caldwell et al. ............ 434/351 |
| 5,526,035 A | 6/1996 | Lappington et al. .......... 348/13 |
| RE35,449 E | 2/1997 | Derks ........................ 395/800 |
| 5,724,357 A | 3/1998 | Derks ........................ 370/413 |
| 5,801,754 A | 9/1998 | Rybal et al. ................ 348/13 |

(Continued)

OTHER PUBLICATIONS

Krueger et al. U.S. Appl. No. 60/222,727, filed Aug. 3, 2000.*

*Primary Examiner*—Jean A Gelin
(74) *Attorney, Agent, or Firm*—Ernest D. Buff & Associates, LLC; Ernest D. Buff; Aniket Patel

(57) ABSTRACT

A method and apparatus provide interactive participation at live entertainment events. Enjoyment for a plurality of participants is enhanced. Participants employ wireless interactive devices that present a promotional message and include user input and output interfaces. Participants are queried, and enter wagers via the user input interface. The wagers are transmitted to a central processor, stored as participant data, and processed into results. A visual display or the user output interface announces the results to the participants.

120 Claims, 4 Drawing Sheets

U.S. PATENT DOCUMENTS

| | | | |
|---|---|---|---|
| 5,860,862 A | 1/1999 | Junkin | 463/40 |
| 5,916,024 A | 6/1999 | Von Kohorn | 463/40 |
| 5,946,635 A | 8/1999 | Dominguez | 455/558 |
| 5,993,314 A | 11/1999 | Dannenberg et al. | 463/1 |
| 6,080,063 A | 6/2000 | Khosla | 463/42 |
| 6,193,610 B1 | 2/2001 | Junkin | 463/40 |
| 6,293,868 B1 | 9/2001 | Bernard | 463/42 |
| 6,434,398 B1 | 8/2002 | Inselberg | 455/517 |
| 2002/0029381 A1 | 3/2002 | Inselberg | 725/9 |
| 2002/0115454 A1 | 8/2002 | Hardacker | 455/457 |
| 2002/0119823 A1 | 8/2002 | Beuscher | 463/42 |
| 2002/0199198 A1 | 12/2002 | Stonedahl | 725/86 |

\* cited by examiner

US 7,587,214 B2

METHOD AND APPARATUS FOR INTERACTIVE PARTICIPATION AT A LIVE ENTERTAINMENT EVENT

RELATED U.S. APPLICATION DATA

This application is a continuation-in-part of U.S. patent application Ser. No. 11/300,208, filed Dec. 14, 2005, now U.S. Pat. No. 7,248,888 which, in turn, is a continuation-in-part of U.S. patent application Ser. No. 10/792,170, filed Mar. 3, 2004, now U.S. Pat. No. 6,996,413, which, in turn, is a continuation-in-part of U.S. patent application Ser. No. 10/378,582, filed Mar. 5, 2003, now U.S. Pat. No. 6,760,595, issued Jul. 6, 2004, which, in turn, is a continuation-in-part of U.S. patent application Ser. No. 09/854,267, filed May 11, 2001, now U.S. Pat. No. 6,650,903, issued Aug. 18, 2003, which, in turn, is a continuation of U.S. patent application Ser. No. 09/656,096, filed Sep. 6, 2000, now U.S. Pat. No. 6,434, 398, issued Aug. 13, 2002. Each of application Ser. Nos. 11,300,208, 10/792,170, 10/378,582, 09/854,267, and 09/656,096 is incorporated herein in the entirety by reference thereto.

BACKGROUND OF THE INVENTION

1. Field of the Invention

The present invention relates to a system and method for interactive audience participation at a live entertainment event at a live event venue; and more particularly, to a system and method by which participants place wagers related to the live entertainment event in response to queries using wireless interactive devices, the wagers are processed and results are announced, thereby enhancing the participants' experience and enjoyment.

2. Description of the Prior Art

Legalized gaming events, which are typically only available at certain event venues such as casinos, horse tracks, and off track betting locations, have become a very popular form of entertainment. Some people known as "professional gamblers" have even chosen to pursue such gaming events as a source of supplemental or primary income.

Millions of people attend their favorite local gaming event venue, choosing among gaming events such as blackjack, poker, roulette, slots, horse racing, sports wagering, and many others. Besides the traditional types of sporting events, such as baseball, basketball, football, and golf, many television networks now also broadcast gaming events, such as Texas Hold 'Em Poker and Blackjack. For example, the ESPN® Network now broadcasts the World Series of Poker® tournaments. Other television networks broadcast horse racing. Rather than merely watching sporting or gaming events on television, fans and/or amateur gamblers are willing to place a wager on the outcome of the gaming event for the excitement and thrill that comes with taking a monetary risk with the potential for a reward.

Audience reaction to a live entertainment event at a live entertainment event venue is generally gauged informally on crowd volume. At certain events, limited amounts of information are shared with participants using large screen displays such as those available from Sony Corporation under the trademark JUMBOTRON®. However, the opportunities for placing a wager from a wireless interactive device in order to participate in the live entertainment event at an event venue are non-existent.

One example of a venue that would benefit from enhanced participation by wagering via a wireless interactive device is a casino. The gaming events at most casinos are typically available twenty-four hours a day, and participants ordinarily spend most of their time sitting in a seat and playing one of the gaming events. When going to the concession stand or restrooms, the participant misses part of the gaming event. Further, the participant is limited by the amount of open seating at their game of choice and/or by the overall size of the event venue, especially during peak operating hours. Participants also desire the ability to participate in gaming events while roaming about the event venue. For example, the participant at a casino desires to place wagers while also sun tanning at the casino pool, waiting in line at the "all you can eat" buffet, or relaxing at the casino lounge. Participants also desire to express opinions concerning facilities, sponsors, players, management and concessions at the event venue. Being able to voice an opinion, and comparing the opinion to that of other participants, would enhance the overall experience. Also, this kind of information can be useful to event venue management by helping to determine the kind of services that participants desire.

It is also noted that participants commuting to and/or from event venues do not have ready access to desirable information such as sports related information and other information such as traffic and weather reports.

Accordingly, there remains a need for a method and system that provides interaction that heightens the enjoyment experienced by participants at a live entertainment event.

SUMMARY OF THE INVENTION

The present invention relates to a method and apparatus for enhancing the experience of participants at live entertainment events. In a preferred embodiment of the invention, there is provided a method for enabling interactive participation at a live entertainment event at a live event venue and attended by a plurality of persons, at least a portion of whom are participants. Each participant employs a wireless interactive device having capability (i) to receive and transmit messages, (ii) accept input via a user input interface, and (iii) output messages to a user output interface. The method comprises communicating information and queries to participants at the event to place wagers related to the entertainment event, such as blackjack or horse racing, using a wireless interactive device in conjunction with a wireless communications system. By having and using such a wireless interactive device, participants are permitted to place wagers related to the entertainment event from virtually anywhere within the event venue. Individual participant wagers are received and transferred to a central processor for storage and processing (e.g., tabulation or statistical analysis). Thereafter, the results are optionally announced to the individual participant or to the plurality of persons as a whole. The interactive device is preferably a wireless, hand held device, having user input and output interfaces. The user input interface preferably comprises at least one member selected from the group consisting of a keypad, selection buttons, a touch screen, a rotatable dial, cursor keys, a pointing device (e.g. a mouse or trackball), and a voice recognition system. The user output interface preferably comprises a visible display for alphanumeric, textual, or graphic images and audio output means such as a speaker or earphone. Preferably the device is a cellular telephone, two-way pager, or wireless personal digital assistant (PDA) or pocket PC. It is further preferred that the device be Internet enabled, and that the wireless communication system employ the Internet in the bidirectional communication of data. Alternatively, the interactive device may be a special-purpose device incorporating at least the features needed for the practice of the present method. Communication protocols other than the Internet may alternatively be employed to provide the desired interactive communication.

The device is easily transported, permitting the participant to carry it to other locations in the event venue, e.g. on trips to the concession stands or to the restrooms. If the event venue is a casino, the participant can use the device while sun tanning at the casino pool, while sitting at the casino lounge, and the like. Further, the method presents audio or video promotional messages of sponsors and advertisers to each user of the interactive device. The promotional message may be permanently affixed to the device and/or transmitted to each device via any available communication modality.

In an aspect of the invention, gaming events may be conducted wherein a participant is asked to place a wager related to the gaming event. Using simple input devices, such as arrow keys and an enter key, a touch screen display or a numeric keypad, the participant selects from a list of promptings and/or possible wagers. Preferably, a gaming account is established for each participant. Credits in the form of real money or play money are then added to the gaming account of the winning participants; and credits are subtracted from the gaming account of the losing participants. Prizes may also be offered. The degree of attention and receptivity accorded to promotional messages and advertisements received by patrons using an interactive device at a live entertainment event in accordance with the present method is beneficially increased. The combination of the atmosphere of the live venue with the interactive content; and the stimulus of active participation and interaction with other participants at the venue frequently heightens the degree of interest of participants at a live event for proffered advertisements over that accorded by those who passively view or hear broadcast coverage at home or another remote location. The spontaneity and excitement engendered at the actual event enhance the likelihood that a participant will perceive advertised items favorably. A participant at the live event is also more likely to respond positively by purchasing food and beverage items, souvenirs, promotional merchandise, and the like.

In a further aspect the method makes it possible to receive instantaneous and correlated feedback from a large number of motivated patrons. Their comments, directed both to advertised products and services and to the entertainment itself, are valuable information for sponsors, event venue management, and providers of goods and services, for example.

In yet another aspect of the invention, event-related audio or video content are optionally transmitted wirelessly to the interactive device during the live event for output to the user. The transmitted content optionally includes other desirable informational items such as news, traffic, weather conditions and forecasts, news and scores of sporting events. The availability of such material increases participants' enjoyment and the perceived value of attending the event venue. The method and system of the invention are advantageously practiced at a live entertainment event, by which is meant an organized event wherein a large number of patrons are gathered to witness and enjoy in real time any form of entertainment, including an event such as a gaming event such as blackjack, roulette, or poker, or an athletic performance such as football, basketball, or baseball. Ordinarily, such live events are scheduled and organized and may involve programmatic content or entertainment, e.g. comprising an athletic contest, concert, speaker, performer, exhibition, or the like. In many instances, the programmatic content has a defined duration, such as an athletic contest or concert that has an identifiable beginning and end. In other instances, the live event comprises a plurality of constituent parts, such as a tennis tournament, in which plural matches are played during the course of a day's activity. Matches in such a tournament may be played on a single court, or concurrently on plural courts in some venues. Further, if the event is a gaming event, it usually takes place at casinos and the event typically available twenty four hours a day. When attending a casino, interested participants must enroll in their game of choice in order to participate in the gaming event and place wagers related thereto.

In another embodiment of the present invention, a method for enabling interactive participation at a live gaming event at a live gaming event venue and attended by a plurality of persons at said venue is disclosed, at least a portion of said persons being participants employing a wireless interactive device having capability (i) to receive and transmit messages, (ii) accept input via a user input interface, and (iii) output messages to a user output interface. The method comprises the following steps. A wireless communication system is provided for transmitting and receiving messages with the interactive device. A plurality of the persons is enrolled as said participants. A gaming account is established for each of the participants, wherein the gaming account has an initial gaming account value. The participants are queried to place a wager related to the live gaming event with the wager being entered by the participants through the user input interface and transmitted by the interactive device. The wagers entered by said participants are received and transferred to a central processor. The outcome of the live gaming event is displayed to the participants on the interactive device. According to the outcome of the live gaming event, the wagers are processed into results using the central processor and credits are awarded to the gaming accounts of the winning participants.

Events frequently, but not always, require the payment of an entry fee by an attendee. Live entertainment events in most cases are open to any member of the public who purchases the requisite ticket or otherwise pays the entry fee, or in the case of gaming events, meets the age requirements and enrolls in the gaming event of choice. Alternatively, participation may be restricted to persons invited by organizers of the event.

Such live entertainment events may be conducted at permanent facilities, such as indoor and outdoor stadiums and arenas for sporting events and other public gatherings; amphitheaters; auditoriums; concert halls and theaters; race tracks for animals or vehicles; off track betting locations; theme parks; convention centers; casinos; exhibition halls; shopping centers; museums; or other similar venues associated with organized gatherings of large numbers of people. Live entertainment events can also be held at facilities that are temporary and not ordinarily appointed for large gatherings, such as golf courses or temporary urban road racing courses. It is contemplated that the present method may be carried out at events of the aforementioned or similar types.

Often the location of the live entertainment event is a building with defined entrances or an indoor or outdoor area demarcated by fences or other barriers with defined points of entry that may comprise gates, turnstiles, or the like. Many live events take place in a stadium, arena, or auditorium having defined participant seating locations, e.g. seats uniquely denoted by section, row, and seat numbers or the like. In casinos, the various types of gaming events have designated sections on the casino floor with limited seating for interested participants; spectators are permitted to view the gaming events at most casinos by standing or sitting behind the participants. In addition to the actual performance area (such as a playing field or concert stage) and the appointed spectator area, event facilities ordinarily have auxiliary or appurtenant public areas associated therewith. Such areas provide facilities and services that are desirably or essentially associated with the live entertainment event. The auxiliary areas are generally adjacent or in close proximity, and may include non-exclusively: ticket windows; passageways; rest rooms; clubs; restaurants; concession stands selling food and beverages; lounges; overflow areas with audio and/or video links to the principal event area; shops selling souvenirs, promotional merchandise, novelties, or related items; and service facilities such as parking lots and stations for public transportation; and the like. For example, patrons at an athletic event frequently engage in social activity in a venue's parking lot before or after the event, often including the consumption of food and beverage, a practice commonly known as "tailgating." Such activity bears a clear thematic relationship to the athletic event itself, since there is ordinarily extensive conversation about the event, the competing teams or players, or the like. Similar activity is common in connection with concerts and other live spectator events as well. Gaming events at casinos involve live events such as blackjack, poker, and roulette, wherein the live gaming events are held in the section of the casino referred to as the casino floor. Most casinos further include bars, clubs, restaurants, outdoor/indoor pools, lounges, restrooms, lobbies, theaters, shops, and the like. All of these and related activities that are within the penumbra of the programmatic content of the live entertainment event and occurring in the environs of the corresponding live event venue are to be understood as falling within the bounds of the live entertainment event. Therefore, it will be understood that the term "live event venue" as used herein and in the subjoined claims, refers collectively to the primary performance area at which the live event is conducted, the appointed spectator area, and auxiliary areas associated with the location, including areas such as those enumerated above.

Also contemplated within the scope of the invention is interactive participation during other forms of live entertainment.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

For the purpose of illustrating the invention, there is shown in the accompanying drawings a form which is presently preferred; it being understood that the invention is not intended to be limited to the precise arrangements and instrumentalities shown.

DESCRIPTION OF THE PREFERRED EMBODIMENTS

Figure 1:
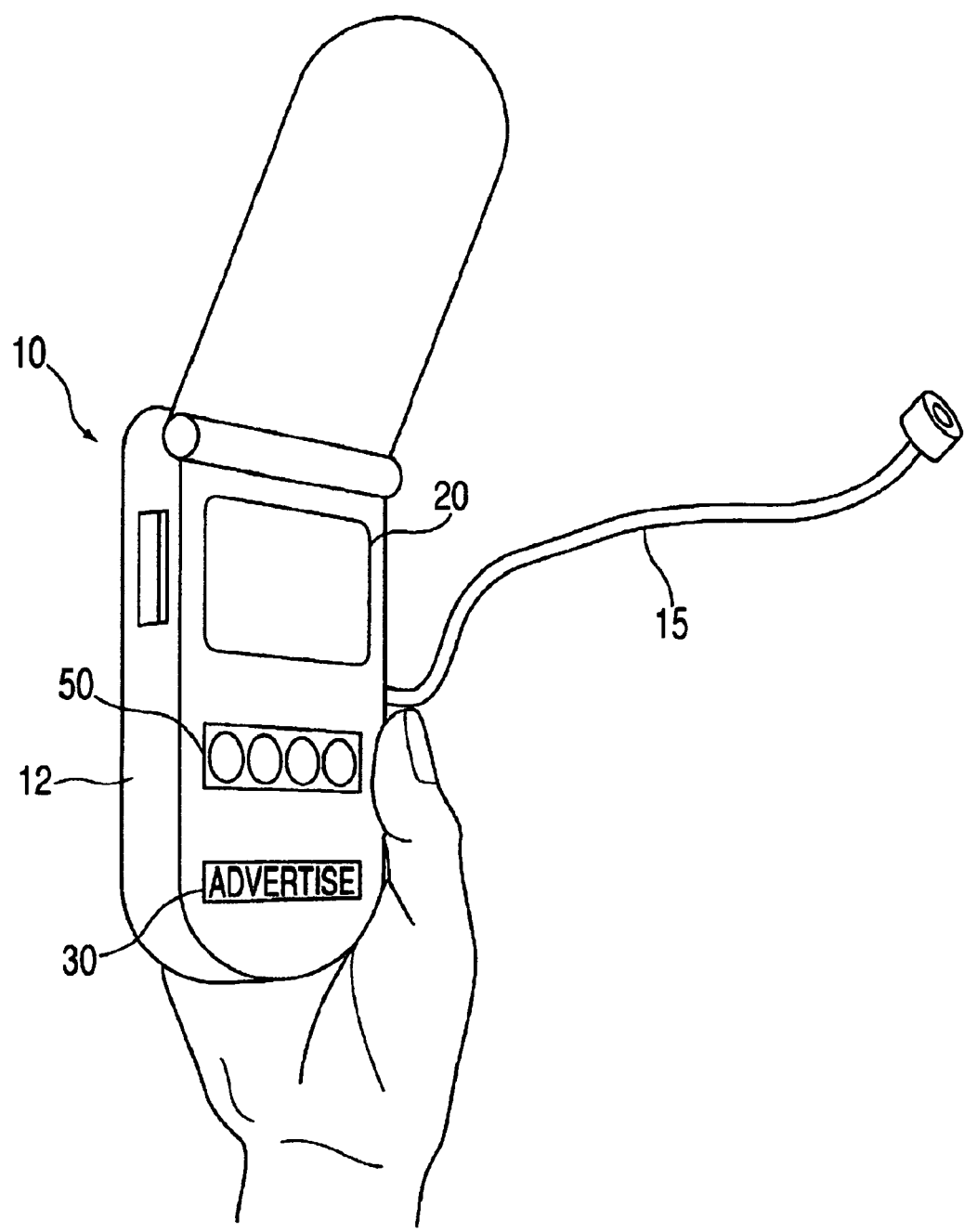
FIG. 1 is a perspective view of a hand held device used in connection with the interactive audience participation system of the present invention.

Referring now to FIG. 1, there is shown one form of a hand held, interactive device 10 adapted for use in connection with the interactive participation system of the present invention.

Figure 2:
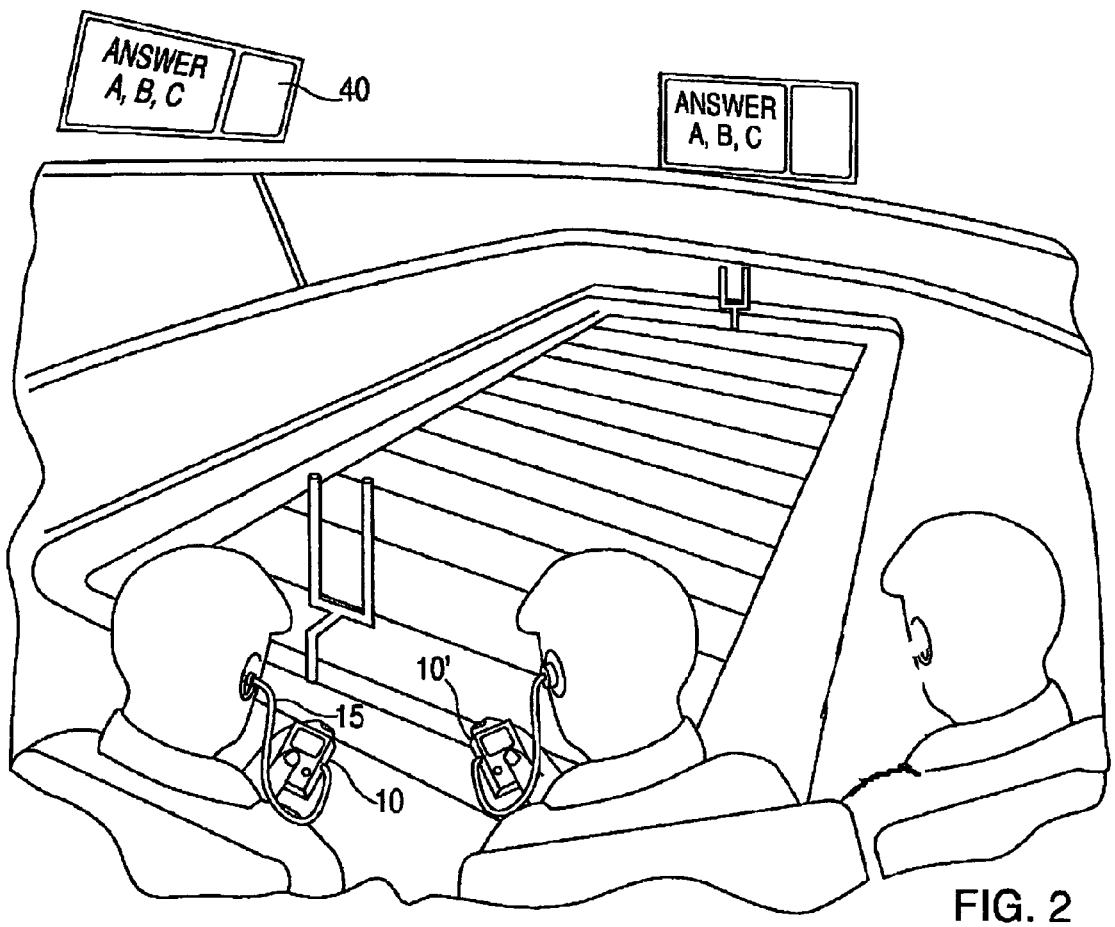
FIG. 2 is a schematic diagram of audience members at a spectator event utilizing the interactive audience participation system of the present invention.
Figure 4:
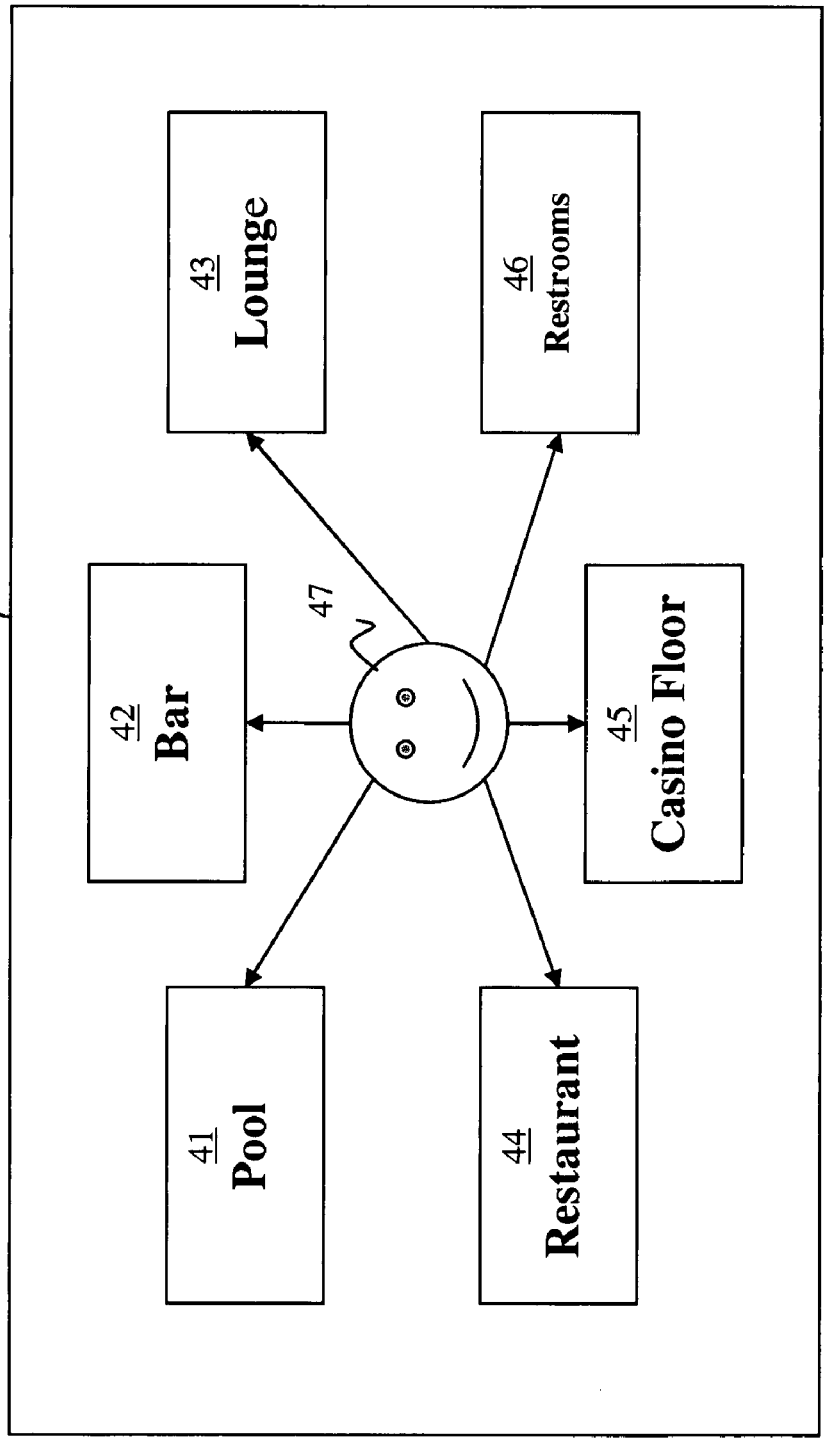
FIG. 4 is a schematic diagram of a participant at an entertainment event venue utilizing the interactive participation system of the present invention.

In one embodiment, device 10 is employed by participants at a live event as shown in FIGS. 2 and 4. The device is adapted to communicate bi-directionally with a wireless communications system operative at a live entertainment event, to provide information to a user, and to accept entry of information through a user input interface for transmission to the wireless communications system. In a preferred embodiment the device 10 includes a housing 12 with an electronic display opening. An electronic display (visual display) 20 providing one form of user output interface is preferably mounted within the housing and is visible through the electronic display opening therein. The electronic display may be of many types, e.g. employing liquid crystal or electroluminescent displays. The electronic display is in electrical communication with a local microprocessor mounted within the housing. A transceiver in electrical communication with the local microprocessor allows for the transmission and receipt of data from a wireless communications system connected to a central processor (not shown) in a manner known in the art. The electronic display is adapted to output information received from the local microprocessor, such as graphic or textual messages that ask the participant to place a wager, answer a question, provide an opinion, or convey other important information. It is contemplated that data in the form of audio messages could be sent to the user in lieu of or in addition to the visual display. The visual display may be limited to presenting alphanumeric messages, but more preferably is capable of displaying graphical, pictorial, or streaming video input at various scan rates, preferably in real time. Keypad 50 accepts user input for transmission to the central processor.

In another aspect of the invention, the interactive device is optionally used by participants to receive audible or video programming, which may be transmitted in the commercial AM or FM broadcast band or at any of a number of predetermined frequencies in the RF, VHF, UHF, or microwave frequency bands. The transmission may be analog or digital. Programming may also be transmitted optically, such as by modulation of an infrared emitting source located in the venue and received by a complementary photoreceptive element in the wireless interactive device and suitably processed for intelligible output. Optionally, the device also comprises means for receiving and displaying video signals such as from ordinary broadcast television stations. Transmission of such program content may be done via conventional commercial broadcast stations or with low power transmitters intended only to cover the immediate live event venue. Transmitters are optionally located either within the venue, in its environs, or in any other location that permits a sufficiently intense signal to be present in the venue. In a preferred embodiment device 10 incorporates circuitry to receive the aforementioned audio or video program content. The circuitry is adapted to receive the content and present it to the user. An earpiece 15 is preferably included to allow the user to listen to the audio content associated with the device without annoying neighboring participants. It is noted that other listening means could be employed such as earphones, speakers, or the like.

In other embodiments the aforesaid audio or video programming may be transmitted via any computer network to which the interactive device is connected, such as by streaming audio or video transmitted via the Internet, in accordance with presently employed protocols or other suitable protocols.

Such audio or video programming preferably comprises information or program content that is thematically related to the live entertainment event or event venue or that provides content useful to the participants at the event. The content may include descriptions of the action at the event, instructions for enrolling as a participant, instructions for wagering, odds paid out, and, in the case of sports wagering, related expert commentary, or instant replays of the sporting event. The content optionally includes other information of interest to participants, such as news and traffic reports and weather conditions and forecasts desired by the patrons. Furthermore, the audio or video programming may include dissemination of questions or other matter incident to contests and polls conducted in accordance with the invention.

It is contemplated that special purpose devices such as the aforementioned interactive device 10 optionally be made available to those patrons who do not carry a conventional wireless device such as a cellular telephone, two-way pager, personal PC, or PDA. Units possessing the required wireless communications capability, electronic display, and user input and output interfaces are easily assembled using off the shelf components, such as transceivers, displays, keypads, and microprocessors, and other miscellaneous electronic components. These special devices would preferably be prepared for each event at one or more locations, having battery charging and menu programming capability, and transported to kiosks or otherwise made available near patron entry points in the venue. The kiosks would each be either sales locations or rental contract stations to secure deposit and payment terms (cash, credit/debit card, etc.), for furnishing the special devices to patrons prior to start of the event, and collection of rented special devices after conclusion of the individual's participation. Optionally, such a device is provided to at least selected participants as part of the price of admission or, alternatively, as an optional item rented or purchased by the participant, and preferably subsidized by the promotional messages.

In another aspect of the invention, wireless devices such as those routinely possessed and used by members of the public, are used for the aforementioned interactive communication. Preferably the wireless devices are selected from the group consisting of wireless personal digital assistants (PDA) and Pocket PC's; two-way pagers; and cellular telephones. Such devices normally incorporate input means such as keypads, selection buttons, and touch screens, and video and audio output means such as display screens, speakers, and earphones. The devices typically include circuitry, such as a local microprocessor, adapted to convert wireless input into forms presented by the output means and to accept user-entered input that is converted for wireless output in a manner known in the art. Many of these devices are also Internet-enabled, that is to say, able to send and receive textual or graphic data in protocols which are commonly associated with Internet technology and able to be processed suitably by routers, servers, and other ancillary equipment used in Internet communication. Additionally, such devices frequently have the capability of sending and receiving electronic mail and Internet-based instant messages which may be transmitted worldwide over the Internet. Suitable PDA's include wireless units sold under the PALM™ tradename by Palm Computing and under the BLACKBERRY™ tradename by Research in Motion. Wireless Pocket PC's sold, e.g. by Hewlett Packard, Compaq, and Dell are also suitable.

Known user-supplied wireless interactive devices are ordinarily equipped with either software or hardware features that provide a unique signature or identification of each device, e.g. the telephone number of a cellular telephone or the IP address of an Internet enabled device. The aforementioned special-purpose devices are also provided with unique identification. Both the special-purpose devices and the user-supplied general-purpose devices are adapted to transmit the unique signature for identification purposes. The present method preferably employs at least one unique signature of each wireless interactive device, whereby a given participant's entries, wagers, and responses may be individually attributed and tracked and the various interactive features described herein may be individually or collectively implemented. In addition, there is generally an electronic account associated with each user-supplied device for charges and credits. In a preferred embodiment, there is a specific gaming account for each participant. The gaming account is preferably established by the event venue management. In accordance with the participant wagers and the outcome of the entertainment event, credits in the form of real or play money may be added or subtracted from the participant's account value. In some of the embodiments of the present invention, charges are levied for goods and services provided and transferred to the account associated with each device. Likewise, monetary credits, coupons, and the like can be disseminated either electronically to the account or by mail to an address associated with the account. In addition, it is preferred that information establishing each participant's location within the live event venue also be associated with that user's device. The association can be effected in many ways. Preferably, a given user is provided with one or more identifying indicia that can be entered using the user input interface of the device and included in the unique signature transmitted by the device. For example, patrons may be provided with indicia distributed beforehand or upon request entered through the wireless device, e.g. through wireless connectivity to the Internet. Indicia may be provided by regular mail, e-mail, telephone text messaging, by connecting with an appointed Internet site, or any other suitable means. More preferably, each entrant receives a ticket that bears unique identifying indicia and an attendee desiring to be a participant enters the indicia using the user input interface of his/her wireless interactive device. In an even more preferred embodiment, suitable for venues in which each patron has an appointed seat location, each entry ticket bears seat location information denoted in ordinary ways, such as by section, row, and seat numbers, and optionally, additional and unique predetermined confirmatory indicia, both of which are entered through the user input interface of the wireless device. The unique signature of each wireless interactive device contains coding corresponding to the seat location and/or the indicia. The entry of both codes provides an improved security feature, since unique signatures corresponding to entries with seat and confirmatory codes which do not match may be excluded as being invalid or possibly fraudulent. The foregoing features by which users are individually identifiable also permit the various services offered selectively to qualified, appropriate, or interested patrons or groups of patrons. Some wireless interactive devices further incorporate localization circuitry, such as Global Positioning System capability, whereby the device can ascertain and electronically transmit its physical location to location receiving circuitry, e.g. as furnished by a wireless service provider.

As there are many suitable alternatives on which to base an embodiment of the current invention which are known to those skilled in the art, the specific interactive device and wireless communications technology used, the specific multiple access communication protocol used, and the specific client/server hardware interface and protocol are not important to the method of the invention so long as they support the required functions. What is important is the method of this invention by which the event venue customer is provided better service.

A number of currently used communications protocols suitably provide connectivity between several of the aforementioned user devices and a wireless communications system. One presently preferred protocol is provided by the commercial cellular telephone network. Many wireless or cellular telephones currently operative with these networks incorporate provisions for sending and receiving textual messages and graphic images, and for exchanging electronic mail through the Internet. Improved capabilities for wirelessly transmitting streaming video at various scan rates are rapidly being developed and are useful in the practice of the present method. Current cellular telephone systems provide various forms of instant messaging capability also useful in transmitting and receiving the queries, advertisements, and the like used in the present method. Messaging in accordance with the Short Message Service (SMS) protocol is presently preferred, but other forms of messaging are also contemplated within the present invention.

The bilateral wireless communications used in the practice of the present method and system are preferably implemented using at least one transmission form selected from the group consisting of radio transmissions, microwave transmissions, broadband wireless data transmissions, and satellite transmissions. Ultra-wide band and spread-spectrum transmission are especially promising technologies for the broadcasting of messages and transmission of participants' responses. The multiplexing and frequency shifting inherently available in such technologies improve immunity to noise and interference and the security of data in transmission. For example, suitable techniques which may be used in the implementation of the present system are practiced in connection with cellular telephone systems, including such currently preferred methods as frequency division multiple access (FDMA), time division multiple access (TDMA), code division multiple access (CDMA), and global system for mobile communications (GSM) protocols, as well as other protocols including those defined by the International Telecommunications Union. Especially preferred are implementations of the present method compliant with interoperability standards promulgated by the Open Mobile Alliance and made available at the website www.openmobile.com and by the WAP Forum at the website www.wapforum.com. It is also preferred that access to the interactive features of the present invention be provided to customers of more than one provider of wireless services, including providers of cellular telephone service or of wireless access for PDAs and Pocket PCs. In some embodiments, such access for participants employing wireless interactive devices served by a plurality of providers is provided by a wireless communications system wherein network connection of plural providers permits needed exchange of information, e.g. via the Internet. In other embodiments, the wireless communication system comprises one or more authorized providers of wireless service. Participants employing wireless interactive devices served by another wireless service provider are furnished an access code, such as a telephone number and optionally further codes, or the like, permitting them to connect to one of said authorized providers, whereby they are enabled to participate in the present method, being afforded access to the various features described herein.

Another preferred communications protocol is specified by IEEE Standard No. 802.11, published by the Institute of Electrical and Electronics Engineers, and incorporated herein in the entirety by reference thereto. Standards in the IEEE 802.11 class (which are also known commonly as "Wi-Fi") specify a local area network system for wirelessly connecting individual devices such as PDA's and Pocket PC's to a local server through which the devices may communicate wirelessly, e.g. through a local intranet or the global Internet. Other wireless protocols that may be used to establish connectivity are also known, such as the Bluetooth Standard, published by the Bluetooth SIG and available through the website www.bluetooth.com, and incorporated herein in the entirety by reference thereto.

It will be understood by one skilled in the relevant art that different transmission modes and frequencies may be used by the wireless communications system for the transmissions to and from the wireless interactive device and that multiple transmission modes and frequencies may be used to accommodate interactive devices of different types simultaneously operated in the present system.

One representative embodiment of the present invention provides a method of enabling interactive participation by a plurality of participants at a live event employing a wireless interactive device. The interactive participation enhances the enjoyment of such participants at a live event transpiring at any form of entertainment venue.

The number of attendees constituting the plurality of participants can vary depending on factors such as the size and nature of the live event, the prevalence of user-supplied wireless interactive devices, the availability of devices for sale or rent on-location, and the characteristics of the venue. At events with a very large number of attendees, e.g. the 50,000 to 100,000 or more fans that attend many major collegiate and professional sports games, a very small fraction of the participants suffices to provide statistically significant information characteristic of the entire crowd if the individuals are representative of the whole. For example, public opinion polls often rely on a sample as small as 500-1000 respondents to infer the views of the entire population of the United States. For purposes of gaming events, one participant is all that is needed for certain types of games such as slots or blackjack. Accordingly, the term "plurality of participants" as used herein, means a number of participants varying from about 1 to as many as 100,000 or more. Preferably the number of participants is at least about 1 percent of those persons present at the live event venue. Most preferably, the plurality of participants ranges from about 25 percent to substantially all the attendees present at the live event venue. In some embodiments, the opportunity for attendees to participate in activities contemplated herein is extended to all those in attendance at the live entertainment event venue that either provide a suitable wireless interactive device or purchase, rent, or are furnished a device at the event.

In a further embodiment, the method and system of the present invention are advantageously practiced in connection with live events that entail simultaneously-occurring but thematically-related activities in different, sometimes non-contiguous locations within an overall event venue, such as golf and tennis tournaments, various casino games, Olympic game events, off-track betting locations, and the like. For example, a golf tournament ordinarily comprises staged play, wherein the competing golfers begin play at individually appointed times over an extended period, so that play is occurring simultaneously at each hole through most of the duration of the event. Important tennis tournaments such as the U.S. Open or Wimbledon are ordinarily played in a venue comprising plural courts on which matches occur simultaneously. During the Winter and Summer Olympics, competition occurs simultaneously in many sports, sometimes in widely scattered and sometimes non-contiguous locations. Similarly, off-track betting parlors, although linked to live activity at a specific horse racing track represent non-contiguous satellite locations at which participants congregate to place wages on horse racing events. Opportunities may likewise exist for sports fans at satellite locations that are not immediately contiguous with a particular sports arena to witness via live broadcasts and speculate on the outcome of a particular sporting event by placing wagers with a teller or via wireless interface. Regarding gaming events, most all event venues have a plethora of various gaming events simultaneously occurring, such as blackjack, roulette, poker and slots. Further most casinos have areas that traditionally do not offer gaming opportunities, such as the pool, bar, restaurant, lounge, restroom, and the like. In such instances, it will be understood that the live event venue may comprise such non-contiguous locations. In each of these situations, the interactivity afforded by the present method provides a marked enhancement of the participant experience. The wireless interactive device of the invention allows participants present at a location in which one of the activities is occurring to remain apprised of the progress of other activities, even those occurring in disparate locations. Further, a participant may place wagers related to one or more live entertainment events from the convenience of a wireless interactive device that does not require the participant to be physically located at a specific location. In a preferred embodiment, the participant must be physically located within the perimeter of the event venue itself, i.e. within the property of the casino or other event venue. In another embodiment, participation in the entertainment event may require the participant to be physically located within certain designated areas of the event venue. For example, the event venue management may restrict use of the interactive device of the present method and system in order to restrict its usage within certain locations such as certain upscale restaurants and bars located within the event venue. Further restrictions may include the hotel rooms of the event venue, if any.

In yet other embodiments, the present method is also used in connection with live entertainment that is not associated with specific and defined programmatic content having an identifiable duration, such as that associated with an athletic event, a musical or theatrical performance, or the like. For example, the entertainment may be provided inherently to individuals as a consequence of patronizing a museum, casino, shopping mall, theme park, agricultural fair or similar exposition, a trade show, convention, or the like. Such situations may or may not include specific programmatic content having a generally defined duration. In some instances, the totality of entertainment activities has a duration bounded by opening and closing hours of a museum, mall, park, fairgrounds, convention hall, or the like. On the other hand, casinos often operate around the clock. Several games that are typically offered by casinos around the clock include blackjack, roulette, video poker, slots, poker, craps, bingo, Texas Hold 'Em poker, Caribbean stud poker, horse racing, and sports wagering. In any case, it is to be understood that the term "live entertainment event" is bounded, with respect to any particular individual, by that individual's active or passive participation in any form of entertainment, instruction, or promotion associated with the venue.

For example, at a trade show, an attendee is often provided with commercial or technical information or promotion of goods or services offered by exhibitors at the show. It is to be understood that dissemination of such information or promotion constitutes entertainment within the meaning of that term as used herein, and the duration of the live entertainment event is understood to be defined by the attendee's presence at the venue. Similarly, a casino is often associated with a venue that includes a gaming area (i.e. the casino floor) in which persons engage in any of a variety of games of chance or gambling, as well as other appurtenant areas providing restaurants, shops selling various forms of merchandise, theaters or auditoriums, public gathering areas, and hotel accommodations. Participation in the present interactive method may be afforded to persons in any of these locations, all of which are to be understood as included in the term "live entertainment venue" as used herein. Other auxiliary areas such as parking lots, lawns, and the like are to be understood as included as well. The operation of casinos often entails some activities that are substantially continuous or repetitive in nature, such as the various games of chance (i.e. gaming events) known to patrons of such establishments, as well as other forms of entertainment that have a defined duration, such as live stage entertainment shows, concerts, sporting events, or the like. All of these activities are to be understood as being part of a live entertainment event for a participant enjoying these activities during his/her attendance at the live event venue.

In a step of the method, there is provided a wireless communication system adapted to transmit and receive messages with the wireless interactive devices used by the participants. The wireless system is further used to disseminate promotional messages to the participants through the user output interface of the wireless device.

The wireless device employed in the present method preferably presents promotional messages or advertising from sponsors and/or advertisers. Monetary compensation for the presentation of such advertising material is optionally used to defray or underwrite the costs associated with practice of the present invention. Messages can be in the form of indicia 30 located (e.g., physically imprinted) on devices loaned, rented, or sold to participants. Additionally, the messages can be visually displayed by the device or can be aurally communicated through the same. The messages can be in the form of preprogrammed or stored aural or visual messages or recordings that are played, e.g. when the device is powered up or down, or at regular or random intervals during usage of the device. Preferably, messages are transmitted by the wireless communication system and presented live during the entertainment event via open band lines. Visual advertising may be presented in discrete segments interspersed with program content or it may be incorporated substantially continuously into the overall image being presented at a given time, such as a banner ad.

In still another aspect of the present method, demographic information or characteristics of the users of wireless interactive devices are gathered and used in various ways. Users may be asked to enter information, such as their age or gender. Alternatively, such information may already be extant and available in databases, such as records of cellular telephone customers. Such information may be used to select which of a plurality of advertisements are most appropriate and likely to be of interest to a given user. The individual addressability of devices such as cellular telephones and wireless PDA's permits individually selected commercials to be presented to particular individuals or groups. Demographic information may also be used to tailor questions and limit contest participation to selected users. For example, in some embodiments participation in all or part of a survey or competition may be offered only to a restricted group, such as preferred corporate customers, patrons in selected classes of seats, season ticket holders, youths, or other defined groups. At a casino or other entertainment venue within which entry to certain areas and participation in certain events, e.g. gambling and consumption of alcoholic beverages, is restricted by age, promotional messages may be limited accordingly. In addition, customer survey information is considered more useful by advertisers if the answers are categorized by the demographics of the respondents. All of these functions are easily implemented in the practice of the present method.

In an aspect of the invention, interactive participation using the present method and system is limited to participants who have been enrolled. Such enrollment may be effected by any suitable process carried out either before or during the live entertainment event. Optionally, enrollment requires monetary consideration from the person becoming an enrolled participant. Preferably, a participant enrolls by entering a predefined participant activation code using the wireless interactive device. In some implementations, an activation code is printed on a patron's entry ticket. Optionally the enrollment comprises entry of a physical location, such as a patron's designated seat in an auditorium or stadium. The activation code may also carry location information. Alternatively, prospective patrons may enroll by a method including a request for enrollment transmitted by telephone, e-mail, interactive registration through an Internet site, regular postal mail, in person at a kiosk at the event venue, or by using dedicated terminals at the venue. Optionally, the patron is provided with an activation code to be entered using the user input interface of the wireless device. Alternatively, persons having a suitable wireless device with localization circuitry may be identified as being present in the venue and thereafter enrolled automatically or be offered the chance to accept enrollment, e.g. by exchange of text messages. In other embodiments, participation is limited to persons who have enrolled and who are also identified by wireless device localization circuitry as being physically present at the event venue. Optionally, the participant status is terminated when the individual is no longer present in the venue, but may be restored automatically upon return to the venue. The enrollment may also be for a predetermined time period and expire thereafter. The dissemination of information, such as promotional messages and queries for the interactive contests afforded by the present method, may be limited to participants actually present at the venue.

In yet a further aspect, the present method may be used to conduct contests, games, and opinion polls of many types. Generally stated, such activities comprise the steps of: posing one or more questions to participants; eliciting the participants to enter an answer to the question using their wireless interactive devices; and processing the results. The questions may be posed using any communication form by which they can be effectively conveyed to participants. Preferably the questions are in a form that may be answered by selection of one of a relatively limited number of alternatives, such as a multiple-choice question or a rating scale. Answers may be entered using the user input interface. Preferably, the results are reported to at least the participants, but they may also be furnished to sponsors, advertisers, or other interested parties.

Contests and games may include many different types of questions. At sporting events, questions may likely entail game strategy; evaluations of performance; predicted outcomes of upcoming plays or games; trivia questions about past or present players, teams, championships, and performance statistics; or the like. For example, at an athletic event such as a football game, the questions may relate to selection of a most valuable player or to game strategy, such as whether a running or passing play is preferred in a given field situation. At a golf tournament, participants might be asked to indicate which club a player ought to select to accomplish a given shot. Concert goers might be asked to select a favorite song or artist from a number of choices presented or to choose songs to be performed during the concert. Civic events and political rallies might evoke questions about preferences of candidates for public office, opinions about civic issues, legislation, and public policies of many sorts. When practiced in connection with live entertainment events at a casino, the questions might involve tips, strategies, and instructions relevant to games of chance and participation therein. Participants may also be asked to rate goods or services, e.g. for quality, popularity, ease of use, or other desired characteristics. Other types of questions of more general nature and interest may also be used. Answers may be accepted for an extended period up to the full duration of the live event, but preferably are accepted during a limited, preselected time interval. Preferably, participants in the contests, games, or polls conducted in accordance with the invention are awarded prizes or other forms of consideration as inducement to participate. For example, one or more participants who correctly answer contest questions or participate in games or opinion polls may be awarded a cash prize or credit. One preferred form for the delivery of such a credit is an electronic coupon that can be redeemed for any form of consideration, including concessions, merchandise, and/or other prizes available at the live event venue. For example, a message may be transmitted to a user's wireless device bearing a unique authentication code that could be verified by a vendor, such as through a cash register electronically linked to the central processor or order processing server, or by a telephone call to a preselected verification number. Alternatively, a graphic image such as a bar code or other like pattern indicative of the coupon could be delivered for display on the user's wireless device and read by a suitable reader at a cash register. In still another alternative, a printed coupon can be physically delivered to the participant based on the location of the user's interactive device by means of communication with the transceiver located therein or by other indication means, or delivered to a remote location by actual physical delivery by mail or the like, or by any form of electronic delivery. In still another alternative, either points or direct monetary credits are entered electronically into an account associated with a user, such as a user's credit or debit card, an account for the user's wireless device or Internet service provider, or by other like means known in ordinary commerce. For example, a user collecting sufficient points may redeem them for goods, services, or money.

In an implementation, the present method also comprises querying the participants to respond with answers entered through the user input interface of the wireless device and transmitted therefrom using the wireless communication system. The answers received are transferred to a central processor for processing into results. It will be recognized that the accumulation of results may be done in the central processor or in one or more distributed receiving servers networked in data communication with the central processor by techniques well known in the computer art, such as by use of a local area network communicating over wire, wireless, or fiber optic communication links. Preferably, a stored computer program operative in either form of server accumulates and stores the incoming answers, at least temporarily, as participant data. The results of processing the participant data are also preferably stored, at least temporarily. At a suitable time, such as after the expiration of an announced deadline for participants to enter and transmit their responses to queries, the processed results are then announced to the participants. Optionally prizes are awarded to participants who have entered an answer.

In another implementation, the present method also comprises querying the participants to place a wager related to the live entertainment event with the wager being entered by the participants through the user input interface of the wireless device and transmitted therefrom using the wireless communication system. The wagers received are transferred to a central processor for processing into results. It will be recognized that the accumulation of results may be done in the central processor or in one or more distributed receiving servers networked in data communication with the central processor by techniques well known in the computer art, such as by use of a local area network communicating over wire, wireless, or fiber optic communication links. Preferably, a stored computer program operative in either form of server accumulates and stores the incoming wagers, at least temporarily, as participant data. The results of processing the participant data are also preferably stored, at least temporarily. At a suitable time, such as after the expiration of an announced deadline for participants to enter and transmit their wagers to queries, the processed results are then announced to the participants. Preferably, credits in the form of real money or play money is added or subtracted to the participant's account according to the outcome of the live entertainment event. The amount of the addition or subtraction to the participant's account may depend on the amount of the wager, the type of gaming event, the odds related to the wager, etc. Optionally prizes are awarded to participants who have entered an answer.

It will be understood that all of the aforementioned computing functions can be carried out by one or more general-purpose computer processors located either within the event venue or its environs, or at a remote location liked by any suitable data communications link using cable, fiber-optic, wireless, or other comparable transmission. The computing functions may be carried out by a single central processor, by linked distributed processors, or a combination thereof.

Queries can be promulgated to the participants in many ways, including notice given by public address system announcements, visual displays on scoreboards, video monitors, or the like visible to the participants, or by messages such as aural, textual, or graphic messages transmitted to the interactive units and then output to the participant using the user output interface. In some implementations questions may be printed in event programs, flyers, newspapers, or the like. Optionally the queries are included in content provided by Internet portal sites to which the participants are connected. Questions may also be included in audio or video play-by-play descriptions, commentary, or announcements, or in other program content broadcast to the interactive units. Preferably, the questions or invitations to place a wager are promulgated using at least one display visible to the participants. More preferably, the visible display comprises large-scale displays, scoreboards, and/or monitors provided in the venue. After assimilation and processing of participant responses and wagers, announcement of results may be given to the participants by similar means, or by another form of public dissemination, such as an Internet posting.

Displaying the results of the processing of the participant data is a step that generally follows the processing of the participant data. This provides feedback to the participants, for example showing them how their answers and/or wagers compared to those of other participants.

In one embodiment, a display visible to a sizable number of participants, such as large scoreboard or screen display 40, as depicted in FIG. 2, is used both for promulgating queries to participants and for announcing results. Any one or more large display devices capable of displaying a video, graphic, or alphanumeric image to a large number of participants may be used, a JUMBOTRON® display being one suitable and preferred type. Alternatively, the display visible to the participants comprises plural video monitors, preferably dispersed throughout the venue. For example, such monitors in the form of CRT displays, plasma screens, or other forms of video display devices may be provided in auxiliary areas of the live event venue or in private luxury box seating areas, such as those now commonly found at sports stadiums. Although FIG. 2 depicts the practice of the present method a football stadium, it will be understood that the present invention may also be practiced at any other type of live event venue.

The questions and results are optionally displayed on these monitors. A user input interface, such as keypad 50 on device 10, allows an audience member to enter a response to queries. Examples of simple user input interfaces include a keypad, selection buttons, a touch screen, a rotatable dial, a pointing device such as a mouse or trackball, and a voice recognition system, but any other user interface by which the required input can be effected could be incorporated in the practice of the invention. A voice recognition system advantageously facilitates the use of the present system by visually impaired persons. Many easy to use interfaces are known to one of ordinary skill in the art, and the invention is not limited to any particular user interface.

In FIG. 2 there is depicted the practice of an embodiment of the invention. At least some of the spectators at an athletic event occurring in a large, outdoor stadium are provided with an interactive device 10 and 10'. It will be understood that the interactive device may be an item provided by the participant such as a cellular phone, or a wireless PDA or Pocket PC. Alternatively, suitable general- or special-purpose devices are made available at the spectator venue for purchase or rent or are given away without charge. In still other embodiments, the present system is operative both with user-provided devices and devices made available at the live event. The present inventor contemplates that only a portion of the spectators in attendance at an event may choose to participate, either by using a suitable interactive device they furnish or by obtaining a unit at the venue. In other embodiments of the invention up to substantially all of the patrons at a live event participate in accordance with the present method. In some implementations, participation is limited to participants who have officially enrolled, as provided herein. FIG. 2 further depicts the users entering answers to a query using keypads available on their respective interactive devices and the display of answers on a large display board 40. In addition to displaying results of the audience querying or contest, the material displayed on board 40 or dispersed video monitors optionally also includes promotional messages or advertising. For example, a given contest question might be sponsored by a business entity in return for including advertising for the entity's products or services during the querying and announcing associated with that contest.

The offering of prizes to one or more selected participants who have responded to the querying, participated in the interactive games, or correctly answered quiz questions may be utilized to enhance the enjoyment of participants, to encourage further participation in the querying and contest aspects of the present method, and to promote the sale of goods and services. Such prizes include goods and services of any form or discounts toward the purchase thereof. Items may be delivered directly to a winning patron either at the live event location or another preselected location. Alternatively, coupons redeemable for items or services at no cost or at a reduced cost may be delivered to the winning patron in person; by mail or similar delivery service; or transmitted electronically using a message to the patron's wireless interactive device or as an entry in an account of the patron, such as a credit or debit card account, a wireless service provider account, or the like. In a preferred embodiment, credits or coupons are transmitted to the winning patron in conjunction with billings for such an account of the patron.

The responses of the participants are sent to a central processor (not shown) having a computer program stored and operative therein that is adapted to tabulate the responses. Then, the processed information is stored and displayed to the audience member, either on the device 10 or a large screen display 40 remotely located from the fan. FIGS. 1 and 2. The processed information could be a compilation or tabulation of similar responses, as either a number or a percentage of total responses, a graphical representation in a bar chart, pie chart or the like, or a combined graphical and numerical representation of the data. The processing further may include categorization of participants' responses according to demographic characteristics, which might include the age or gender of the participant or his/her preferred team loyalty.

In addition to prizes that can be won by participating in the contests and polls described above, a number of other incentives are optionally offered to attendees to induce them to participate in the interactive aspects of the present invention. In one aspect, access to a chat room and instant messaging are provided to select persons, who are preferably all live entertainment event attendees. Participants may be enrolled by any suitable process, as delineated hereinabove. Messages may be exchanged interactively among the participants using any suitable protocol, such as cellular telephone text messaging and known systems used for instant messaging between Internet enabled personal computers and Internet-enabled wireless telephones, PCs, and PDAs. Optionally, enrolled participants are offered the chance to receive one or more newsworthy instant messages from a message sponsor, such as one of the participating teams in an athletic event, during the course of the live event. For example, at a sporting event such messages might provide condition reports on injured players or information on game strategy from expert commentators or coaches. In some embodiments, the chat room and instant message features are provided at no cost, while in others, a fee might be charged by the offering entity for the services. Other services optionally provided to enrolled participants might include user-selectable, on-demand instant replays and commentary concerning the live event; and cellular telephone ring tones associated with a sports team or other identifiable entity.

Other incentives optionally offered to induce spectators to participate include monetary considerations, discounts, or coupons redeemable for at least part of the cost of goods or services. Such forms of consideration may be physically delivered to a participant at the event venue or another location. Preferably, consideration is provided by electronic transfer using systems known in the art or as described elsewhere in this specification.

Still another incentive to participate is provided in implementations wherein food, beverages, goods, services, or the like can be ordered directly using the wireless interactive device. At virtually every live entertainment event, food and beverages intended for consumption during the event and merchandise thematically associated in some manner with the event are sold at various locations of the live event venue and by roving vendors. For example at a sporting event, the items offered may include wearing apparel bearing team logos, trademarks, or other indicia associated with a team or its players; related memorabilia such as souvenirs, posters, photographs, and recordings; and sporting equipment. Items sold at a concert or dramatic performance might include wearing apparel bearing indicia associated with the show or particular performers, programs, recordings, photographs, posters, or the like. The term "promotional merchandise" is often used generically for items marked with such logos; trademarks; images of players, performers, and event venues, especially those considered historically significant; and similar indicia. Other general interest items, novelties, tickets for future events, and the like are also sold.

In another embodiment of the present invention, the participant attends a gaming event venue such as a casino, horse track, or off track betting location. Regarded as a type of "answer", the participant is queried to more particularly place a "wager" related to a live entertainment event, and more specifically a gaming event. The participant places a wager related to the gaming event, such as blackjack, roulette, video poker, slots, poker, craps, bingo, Texas Hold 'Em poker, Caribbean stud poker, horse racing, and sports wagering. The specific rules of the gaming event, including the type and amount of the wager, is dependent on the specific type of gaming event and is known to those of ordinary skill in the art. Therefore, it is not necessary to discuss the details and rules of each type of gaming event named herein. However, it should be understood that a "wager" may consist of a bet (i.e. "raise" in poker), an instruction (i.e. "double down" in blackjack), an action (i.e. "fold" in poker), a lack of any action (i.e. "check" in poker). That is, as used herein, a "wager" may actually describe a series of actions related to a single "hand", "spin", etc., as opposed to a single action or bet. For example, when playing a single hand of Texas Hold 'Em poker, the participant may make several raises and checks during the single hand; these actions may either individually or collectively be referred to as a "wager", depending on the particular rules and nomenclature established by the event venue.

Preferably, a gaming account is established for each participant when the participant enrolls at the event venue. Preferably, the gaming event venue, such as a casino, strictly controls and manages the gaming account for each participant. That is, a participant establishes a gaming account that is unique to each different gaming event venue. For example, a participant must preferably establish a new gaming account should the participant desire to visit a different gaming event venue. Preferably, the gaming account allows a participant to electronically deposit and withdraw funds from the participant's banking account. A credit card, bank account number, prepaid account number, or other similar reference by which money is electronically credited may also be utilized. Alternatively, any mechanism for effecting electronic payment known in the relevant art is used. The gaming account is secure and preferably requires the use of one or more unique passwords for access by the participant. In an alternative embodiment, rather than real money, the participant instead uses play money to participate and place wagers related to gaming events. The use of play money is especially beneficial to novice participants who desire to learn and practice before wagering real money.

In one embodiment of the present invention, the gaming events are virtual; that is they are not actually visible or physically taking place in the real world, but instead occur over computer networks and are controlled by computer programs. Computer programs to run games of chance, such as blackjack, Texas Hold 'Em poker, roulette, and the like, are understood by those skilled in the art and require no further description. Such computer programs preferably include computer icons and graphics to mimic the actions that take place if the game was actually taking place in the real world. For example, individual participants are assigned a unique avatar to distinguish the participants from one another; wager amounts are depicted by graphical images of casino chips; and a casino dealer, table, and chairs are graphically depicted;

each of these graphical depictions are preferably viewable on the user output interface of the wireless interactive device.

In summary, the participant is enabled the opportunity to place wagers and "gamble" electronically (i.e. virtually) by using the method and system of the present invention that involves the use of a wireless interactive device. Rather than physically sitting at the table games or slot machines on the casino floor, the participant is free to move about the event venue while gambling electronically. For example, the participant may play video poker while sipping on a cocktail and lounging by the outdoor pool of the casino. The participant does not have to be exposed to the crowds and germs otherwise encountered at the table games on the casino floor. Further, the participant never has to wait for an available seat to open on the $5 blackjack table on the casino floor, for example. Further, the casino increases its revenue by allowing access to gaming by all guests at all times. It should further be understood that the participation in gaming events must be done legally by both the event venue and the participants.

Advantageously, the participant simply uses the wireless interactive device to gamble when and where he chooses, so long as he does so within the rules set by the event venue. Another advantage of the present invention, is that inexperienced gamblers can in effect play "privately" without facing possible embarrassment by other participants should they make a novice mistake. Further, compared to gambling online over the Internet within the confines of one's home, the participant is afforded the social advantages of gambling around other people, being out of the house, and having access to the other amenities of the event venue at their fingertips. Further, because the management of the participant accounts, wagering, and results is handled by the event venue management, participants may be eligible for "comps" from the event venue for redemption at the event venue's restaurants, shops, and the like. The "comps" may be based on the participant's wagering history as known in the art.

It should further be understood that the event venue preferably earns revenue from the participant wagers. Such revenue may be in the form of a percentage of the wager, a flat fee, an entry fee, an enrollment fee, or the like. Such revenue may also come from advertisement revenue in exchange for the permission by the event venue for the advertisers to transmit promotional messages to the participants via the wireless interactive device.

In a preferred embodiment, a participant must be within the physical boundary of the event venue to participate and place wagers related to the entertainment event. Preferably, the event venue management maintains sole control over the wireless communication system that runs the receipt and processing of the wagers and results of the wagers placed by participants within the event venue. If the event venue is a casino, preferably it further has the ability to accept wagers related to sports wagering and horse racing, and further includes live televised access to the relevant sports activities or horse races. That is, the live entertainment event need not physically occur at the live event venue, so long as live televised access, or other remote access, to the entertainment event is provided at the event venue. Further, the act of wagering on the live entertainment event in and of itself is done "live"; otherwise, the act of wagering would be meaningless because the wager is by definition based on predicting the outcome of events that have yet to occur.

In other embodiments, the live entertainment event is held at the event venue. For example, the casino may include an arena or theater for the administration of a boxing match or other live entertainment event, whereby the participants may place wagers related to the entertainment event by using the method and system employing the wireless interactive device as described herein. In another example, the event venue is a horse track, the entertainment event is a horse race; the wager is related to the horse race; and, therefore, the entertainment event is held at the event venue itself.

In an implementation, participants use the wireless interactive device to place orders for the aforementioned goods and services. Advantageously, the interactive querying and contest aspects of the present method provide an impetus for users also to give attention to advertising that urges the purchase of goods and services. For example, such advertisements may be interspersed with questions and contests, enhancing the likelihood that a patron will be motivated to make a purchase. In an embodiment, advertisements promoting the items are stored in a transaction server or recording system in data communication with the wireless communication system. Advertisements are selectively or generally transmitted by the wireless system for output by the user output interface of each interactive device.

The user enters an order for desired items or services using the user input interface, such as the keypad of a cellular telephone or PDA. In an implementation, the order is transmitted to the wireless communication system and routed to an order fulfillment server system. A computer program stored and operative therein receives the orders and communicates them to a provider of goods and services for order fulfillment. Physical goods, such as food and beverage, promotional merchandise items, and souvenirs may be delivered to the patron's seat, made available for pickup at a predetermined location within the live event venue, or shipped to another appointed location. In some embodiments, the wireless interactive device incorporates circuitry, such as global positioning system (GPS) technology, whereby the device may be localized sufficiently to allow the provider to determine a patron's physical location and thereby effect direct delivery of items to the patron. Alternatively, the user may enter a seat location either as part of the order entry process or at an earlier time, e.g. during enrollment in the aforementioned chat room and instant messaging services. Intangible items or services, such as tickets to future events or coupons redeemable for other items or for reduced prices, may be provided by similar forms of delivery or communicated electronically using known techniques. Optionally, a text message or other message confirming the order is returned to the purchaser for output using the wireless interactive device. Preferably, monetary consideration for purchased goods or services is provided by electronic transfer of funds between bank accounts or by charges billed to a user, such as to a user's conventional debit or credit card or wireless service provider account. Consummation of transactions using other forms of payment known for electronic processing may also be used and are to be considered within the scope of the method of the invention. In one embodiment, the present system is connected to an electronic financial network of a type known in the art. Transfer of funds from the network provides monetary consideration to the provider for the goods and services received by the ordering participant.

In one embodiment, a menu of items available for purchase is transmitted upon the user's request to the interactive device. A hierarchical arrangement of a known sort including submenus may be used in situations wherein more items are available than can be accommodated within the confines of output displays of extant interactive devices. Preferably the items offered include at least food, drink, souvenir merchandise, and tickets for future events. In order to place an order, a user navigates using the input interface through the menus to select one or more items for purchase. The user may further enter location or other identifying indicia, such as a unique seat number or other reference number by which correct delivery may be effected. A credit card, bank account number, prepaid account number, or other similar reference by which money is electronically credited to the vendor in payment for the items ordered is also entered. Alternatively, any mechanism for effecting electronic payment known in the relevant art is used. As is well understood by those skilled in the art, even the limited hardware display and processing capacity of present cellular telephones, PDA's, and pagers is sufficient to accommodate the aforementioned menu and ordering method. However, as time moves on, much higher text densities and graphics resolution will likely become commonplace in such devices and allow ever-increasing functionality to be provided and used in the method of this invention. As hierarchical menu systems have become ubiquitous with the advent of automated teller machines and windowed graphical user interfaces on modern personal computer operating systems, the concept and the method of their use are familiar to many persons and will not be further described here.

The use of electronic ordering and payment facilitates sales made in accordance with the present method. Items can be ordered by patrons from their seats at any time and timely delivered, without the need to wait for the unpredictable arrival of a roving vendor or cocktail waitress who may not even be carrying the item desired. Food and beverage items carried by the roving vendor are often not maintained at a temperature that is pleasing to the patron, i.e. cold items have warmed up and hot items have cooled excessively. The confusion of having to communicate an order in the often-noisy environment of a sports stadium, casino, or other even venue is eliminated, as is the inconvenience of passing money in payment and change, possibly across many patrons between the customer and the closest aisleway. In addition to use of common credit and debit cards as means of payment, corporate accounts and billing through third party accounts such as the customer's Internet service provider or cellular telephone service provider are readily effected in a transaction processed in accordance with the present method.

In addition, other services are optionally offered, such as restaurant, lodging and transportation reservations, biographical and recording data for athletes, concert artists, and other performers, future schedules of events, and myriad other information. This information can be conveyed visually, audibly, or via a combination of both media forms. The offerings presented through the wireless interactive device may be complemented by messages simultaneously displayed on scoreboards, video monitors, or the like to enhance their ability to garner the audience's attention.

Yet another aspect of the invention allows participants to interactively participate in auctions, which may be of any type commonly known, including conventional auctions wherein items are sold to the lowest bidder; Dutch auctions, in which one or more items are offered at a fixed price to the first bidder or preselected maximum number of bidders; a reverse auction, in which the price of an item is lowered in response to a large number of bids received; and other forms. The goods or services offered in such auctions preferably are related thematically to the live entertainment event but may also include any goods or services of interest to the participants. The auctions are conducted by disseminating a description of the goods or services offered to the participants through one or more of the modes discussed hereinabove for the dissemination of the contest queries of the invention. Participants enter their bids or related responses by using the user input interface of their wireless interactive devices. Such auctions conducted at a live entertainment event in accordance with the invention beneficially evoke a high level of interest due to the level of enthusiasm and excitement typically evident at a live event.

Preferably, the opportunity to participate in the various interactive features of the present method and system, along with eligibility for the various prizes and other incentives, are offered to substantially all the persons at the live entertainment event. However, participation in some or all features may be limited to some subset of the persons physically present at the event.

Figure 3:
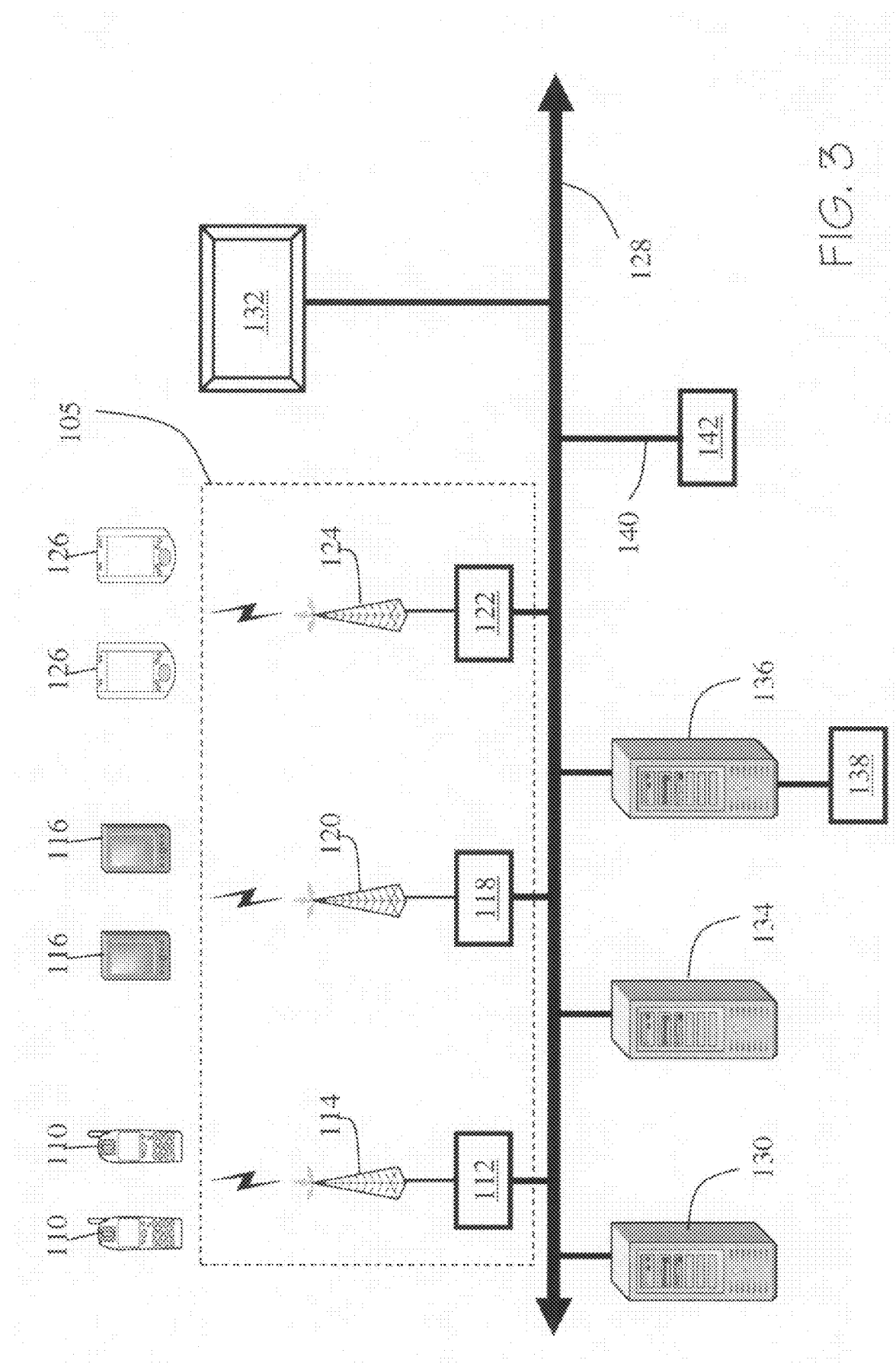
FIG. 3 is a schematic diagram of a system of the invention for enhancing spectator enjoyment and interaction.

FIG. 3 depicts one implementation of the system 100 of the invention. A wireless communications system 105 provides service to cellular telephones, wireless PDA's, and Pocket PC's. Wireless interactive devices used with the system are a plurality of cellular telephones 110 and served by cellular telephone provider 112 through signals transmitted and received at antenna 114. Wireless PDA's 116 are served by wireless PDA service provider 118 through signals transmitted and received at antenna 120. A wireless local area network 122 transmitting signals in accordance with IEEE Standard 802.11 from antenna 124 serves wireless Pocket PC's 126. Each of cellular telephone provider 112, wireless PDA service provider 118, and wireless local area network 122 communicates through the Internet 128. Promotional message server 130 selects promotional messages which are transmitted via the Internet to wireless communications system 105 and broadcast to interactive devices 110, 116, and 126. Promotional messages are also transmitted to stadium display 132, which includes a controller operative to receive digital information, e.g. information received via the Internet, and convert it into corresponding textual, graphic, or video displays for presentation. Central processor 134 provides queries displayed on display 132. Answers to such queries are entered on the user input interfaces of interactive devices 110, 116, and 126 and received by distributed receiving servers (not shown) maintained by each of cellular telephone provider 112, wireless PDA service provider 118, and wireless local area network 122. The distributed receiving servers accumulate the answers and transfer them by Internet to central processor 134 for processing into results, which are then communicated and displayed by display 132. Order processing server 136 receives orders for goods and services entered by participants using their wireless interactive devices and communicates those orders to one or more providers 138 of goods and services, such as food/beverage vendors. Connection 140 to electronic financial network 142 enables the electronic transmission to providers 138 of monetary consideration for the goods and services they furnish. It will be understood by those skilled in the relevant art that the functions of the plural servers alternatively may be shared among a smaller number of servers or may be accomplished by central processor 134. The plural servers also may be in data communications via the Internet or a local network implemented using connections by wire, wireless, or optical data transmission, in any way conventional in the art. Other networking protocols suitable for the interchange of digital information may also be used.

FIG. 4 depicts a schematic diagram of a participant 47 at an entertainment event venue 40 utilizing the interactive participation system of the present invention. Once enrolled, the participant 47 is able to participate in the entertainment event by placing wagers related thereto via the user input interface of the wireless interactive device. For purposes of illustration only, the entertainment event venue 40 is a casino. Other types of event venues may include horse racing tracks and off track betting locations. By utilizing the wireless capabilities of the interactive device and wireless communication system, the participant 47 is able to enroll and place wagers (i.e. gamble) virtually anywhere within the casino 40. For example, the participant 47 may place wagers related to a gaming event while physically located at any of the following locations within the casino: the pool 41, the bar 42, the lounge 43, the restaurant 44, the casino floor 45, the restrooms 46, or other location. The participant enjoys enhanced convenience and access for participation in gaming events, such as casino games and slots, horse racing, sports wagering, and the like. According to the outcome of the gaming event, the system processes the wagers into results and announces the results to the participants.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A method for enabling interactive participation at a live entertainment event at a live event venue and attended by a plurality of persons at said venue, at least a portion of said persons being participants employing a wireless interactive device having capability (i) to receive and transmit messages, (ii) accept input via a user input interface, and (iii) output messages to a user output interface, the method comprising the steps of:
providing a wireless communication system for transmitting and receiving messages with said interactive device;
enrolling a plurality of said persons as said participants;
querying said participants to place a wager related to said live entertainment event with said wager being entered by said participants through said user input interface and transmitted by said interactive device;
receiving said wagers entered by said participants;
transferring said wagers to a central processor;
disseminating at least one promotional message to said participants through said user output interface of said interactive device; said dissemination comprising a promotional message server in data communication with said wireless communication system, said promotional message server providing said at least one promotional message from a plurality of messages stored in said promotional message server to said wireless interactive device through said wireless communications system,
according to the outcome of said live entertainment event, processing said wagers into results using said central processor and announcing said results to said participants.

2. A method as recited by claim 1, wherein said live entertainment event is a live gaming event.

3. A method as recited by claim 2, wherein said live gaming event is a live virtual gaming event.

4. A method as recited by claim 3, wherein said live virtual gaming event is administered by a computer program.

5. A method as recited by claim 2, wherein said live gaming event is blackjack.

6. A method as recited by claim 2, wherein said live gaming event is roulette.

7. A method as recited by claim 2, wherein said live gaming event is video poker.

8. A method as recited by claim 2, wherein said live gaming event is slots.

9. A method as recited by claim 2, wherein said live gaming event is poker.

10. A method as recited by claim 2, wherein said live gaming event is craps.

11. A method as recited by claim 2, wherein said live gaming event is bingo.

12. A method as recited by claim 2, wherein said live gaming event is Texas Hold 'Em poker.

13. A method as recited by claim 2, wherein said live gaming event is Caribbean stud poker.

14. A method as recited by claim 2, wherein said live gaming event is horse racing.

15. A method as recited by claim 2, wherein said live gaming event is sports wagering.

16. A method as recited by claim 2, further comprising the step of: displaying the outcome of said live gaming event to said participants on said interactive device.

17. A method as recited by claim 1, wherein said live event venue is a live gaming event venue.

18. A method as recited by claim 17, wherein said live gaming event venue is a casino.

19. A method as recited by claim 17, wherein said live gaming event venue is a horse racing track.

20. A method as recited by claim 17, wherein said live gaming event venue is an off track betting location.

21. A method as recited by claim 1, further comprising the step of: establishing a gaming account for each of said participants.

22. A method as recited by claim 21, further comprising the step of: establishing an initial gaming account value for each of said participants.

23. A method as recited by claim 21, further comprising the step of: according to the outcome of the live gaming event, awarding credits to said gaming accounts of the winning participants.

24. A method as recited by claim 23, wherein said credits comprise real money.

25. A method as recited by claim 23, wherein said credits comprise play money.

26. A method as recited by claim 1, wherein said wireless interactive device further comprises localization circuitry for transmitting a physical location thereof, said method further comprises the step of detecting said transmitted location.

27. A method as recited by claim 26, wherein said enrolling step is effected automatically for devices wherein said transmitted location is within said live event venue.

28. A method as recited by claim 1, further comprising the step of disseminating at least one promotional message to said participants.

29. A method as recited by claim 28, wherein said promotional message is displayed on said user output interface.

30. A method as recited by claim 28, wherein said promotional message is disseminated for monetary consideration from an advertiser.

31. A method as recited by claim 28, further comprising collecting demographic characteristics of at least a portion of said participants.

32. A method as recited by claim 31, wherein said promotional message is selected based on said demographic characteristics of said participant.

33. A method as recited by claim 1, wherein said transmitting is carried out using at least one of telephone, e-mail, interactive registration through an Internet site, regular postal mail, and a kiosk or terminal at said live event venue.

34. A method as recited by claim 1, wherein said enrolling comprises transmission of a text message from said wireless interactive device.

35. A method as recited by claim 1, wherein said enrolling comprises entry of an activation code using said user input interface of said wireless interactive device.

36. A method as recited by claim 1, wherein said enrolling is terminated upon the departure of said participant from said live event venue.

37. A method as recited by claim 1, wherein said enrolling expires after a predetermined time period.

38. A method as recited by claim 1, wherein a unique signature is associated with each of said wireless interactive devices and is transmitted therefrom.

39. A method as recited by claim 38, wherein said unique signature comprises indicia entered into said wireless interactive devices using the user input interface thereof.

40. A method as recited by claim 1, further comprising the step of providing an entry ticket to each of said persons for entry to said live entertainment event, said entry ticket bearing unique identifying indicia appointed to be entered into said interactive device, and said unique signature contains coding corresponding to said indicia.

41. A method as recited by claim 1, further comprising the step of conducting an auction of goods or services, wherein participants submit bids entered using said user input interface.

42. A method as recited by claim 1, further comprising the step of offering at least one incentive to induce said persons to become said participants during said live entertainment event.

43. A method as recited by claim 42, wherein said incentive comprises the dissemination of at least one instant message to said participants during said live entertainment event.

44. A method as recited by claim 42, wherein said incentive comprises a chat room in which participation is limited to said participants.

45. A method as recited by claim 42, wherein said incentive comprises conveying to said participant at least one of goods, services, or coupons redeemable for at least part of the price of goods or services.

46. A method as recited by claim 42, wherein said incentive comprises electronic transfer of consideration to said participant.

47. A method as recited by claim 1, further comprising the step of relaying informational items, said items being transmitted by said wireless communication system to said wireless interactive device for output using said user output interface.

48. A method as recited by claim 47, wherein said informational items contain event-related content.

49. A method as recited by claim 47, wherein said informational items comprise items selected from the group consisting of news reports, traffic condition reports, weather conditions, weather forecasts, sports news and scores.

50. A method as recited by claim 1, wherein said querying comprises a contest.

51. A method as recited by claim 1, wherein said querying comprises a game.

52. A method as recited by claim 1, wherein said querying comprises an opinion poll.

53. A method as recited by claim 1, further comprising the step of awarding a prize to at least one of said participants who has entered a wager in response to said querying.

54. A method as recited by claim 53, wherein said prize is delivered to said participant.

55. A method as recited by claim 53, wherein said prize is transferred electronically to said participant.

56. A method as recited by claim 1, further comprising the steps of soliciting a purchase of goods or services by said participants; accepting orders for said purchase entered by said participants using said user input interface, transmitted by said interactive device; and submitting said orders to a vendor for fulfillment for monetary consideration.

57. A method as recited by claim 56, wherein said goods comprise at least one item of food, beverage, and promotional merchandise.

58. A method as recited by claim 56, wherein a unique signature is associated with each of said wireless interactive devices and is transmitted therefrom and wherein said goods or services are delivered using said unique signature to locate said participants in said live event venue.

59. A method as recited by claim 56, wherein said interactive device further comprises localization circuitry and transmits a position obtained from said localization circuitry and indicia identifying said device, and said position and indicia are used to effect delivery of goods to said participant.

60. A method as recited by claim 1, wherein said querying is limited to a portion of said participants.

61. A method as recited by claim 1, wherein said wireless communications system transmits and receives using at least one transmission form selected from the group consisting of radio transmission, microwave transmission, broadband wireless data transmission, ultra-wide band transmission, spread-spectrum transmission, and satellite transmission.

62. A method as recited by claim 1, wherein said interactive device is a member selected from the group consisting of cellular telephones, two-way pagers, wireless personal digital assistants, and wireless pocket PC's.

63. A method as recited by claim 1, wherein said wireless interactive device is Internet-enabled and at least a portion of the communications to and from said wireless interactive device is accomplished using the Internet.

64. A method as recited by claim 1, wherein said user output interface comprises at least one of an alphanumeric text display, a graphical display, and an audio output means.

65. A method as recited by claim 1, wherein said querying step is accomplished by at least one display visible to said participants.

66. A method as recited by claim 65, wherein said display comprises at least one of a scoreboard and a large-scale video display.

67. A method as recited by claim 65, wherein said live event venue includes at least one auxiliary area and said display is visible in said auxiliary area.

68. A method as recited by claim 1, wherein said querying step is accomplished by a notice audible to said participants.

69. A method as recited by claim 1, wherein said querying step is accomplished by a message transmitted by said wireless communication system to said interactive device and output by said user output interface.

70. A method as recited by claim 1, wherein said announcing step is accomplished by a notice audible to said participants.

71. A method as recited by claim 1, wherein said announcing step is accomplished by at least one display visible to said participants.

72. A method as recited by claim 1, wherein said announcing step is accomplished by a message transmitted by said wireless communication system to said interactive devices and output by said user output interface.

73. A method as recited by claim 1, wherein said live entertainment event comprises multiple activities occurring simultaneously in different locations within a venue.

74. A method as recited by claim 1, wherein said live entertainment event comprises at least one activity having programmatic content with an identifiable duration.

75. A method as recited by claim 1, wherein said live entertainment event comprises activity that occurs substantially continuously during said event.

76. A system for enabling interactive participation at a live entertainment event at a live event venue and attended by a plurality of persons at said venue, at least a portion of said persons being participants employing a wireless interactive device having capability (i) to receive and transmit messages, (ii) accept input via a user input interface, and (iii) output messages to a user output interface, the system comprising:

a wireless communication means for transmitting and receiving messages with said interactive device;

means for querying said participants to place a wager related to said live entertainment event with said wager being entered by said participants through said user input interface and transmitted by said interactive device;

means for processing into results said wagers entered by said participants according to the outcome of said live entertainment event, said wagers being received by said wireless communications system, and transferred to a central processor;

means for announcing said results;

means for disseminating at least one promotional message to said participants through said user output interface of said interactive device; said dissemination comprising a promotional message server in data communication with said wireless communication system, said promotional message server providing said at least one promotional message from a plurality of messages stored in said promotional message server to said wireless interactive device through said wireless communications system.

77. A system as recited by claim 76, wherein said live entertainment event is a live gaming event.

78. A system as recited by claim 77, wherein said live gaming event is a live virtual gaming event.

79. A system as recited by claim 78, wherein said live virtual gaming event is administered by a computer program.

80. A system as recited by claim 77, wherein said live gaming event is blackjack.

81. A system as recited by claim 77, wherein said live gaming event is roulette.

82. A system as recited by claim 77, wherein said live gaming event is video poker.

83. A system as recited by claim 77, wherein said live gaming event is slots.

84. A system as recited by claim 77, wherein said live gaming event is poker.

85. A system as recited by claim 77, wherein said live gaming event is craps.

86. A system as recited by claim 77, wherein said live gaming event is bingo.

87. A system as recited by claim 77, wherein said live gaming event is Texas Hold 'Em poker.

88. A system as recited by claim 77, wherein said live gaming event is Caribbean stud poker.

89. A system as recited by claim 77, wherein said live gaming event is horse racing.

90. A system as recited by claim 77, wherein said live gaming event is sports wagering.

91. A system as recited by claim 76, wherein said live event venue is a live gaming event venue.

92. A system as recited by claim 91, wherein said live gaming event venue is a casino.

93. A system as recited by claim 91, wherein said live gaming event venue is a horse racing track.

94. A system as recited by claim 91, wherein said live gaming event venue is an off track betting location.

95. A system as recited by claim 76, further comprising the step of: establishing a gaming account for each of said participants.

96. A system as recited by claim 95, further comprising the step of: establishing an initial gaming account value for each of said participants.

97. A system as recited by claim 95, further comprising the step of: according to the outcome of the live gaming event, awarding credits to said gaming accounts of the winning participants.

98. A system as recited by claim 97, wherein said credits comprise real money.

99. A system as recited by claim 76, further comprising the step of: displaying the outcome of said live gaming event to said participants on said interactive device.

100. A system as recited by claim 97, wherein said credits comprise play money.

101. A system as recited by claim 76, wherein said wireless interactive device further comprises localization circuitry for transmitting a physical location thereof, said system further comprises means for detecting said transmitted location, and means for automatically enrolling a plurality of said persons as said participants when said transmitted location is within said live event venue.

102. A system as recited by claim 76, wherein said wireless communications means comprises at least one wireless system operated by a wireless service provider.

103. A system as recited by claim 76, wherein said querying means comprises at least one display visible to said participants.

104. A system as recited by claim 76, wherein said announcing means comprises at least one display visible to said participants.

105. A system as recited by claim 76, further comprising at least one prize appointed to be awarded to at least one of said participants.

106. A system as recited by claim 76, further comprising an order processing server in data communication with said wireless communications means, said order processing server receiving orders for goods and services entered by said participants using said user input interface and communicating said orders to a provider of goods and services for order fulfillment.

107. A system as recited by claim 106, further comprising a connection to an electronic financial network by which monetary consideration is received for said goods and services provided to said participant by said provider.

108. A system as recited by claim 76, wherein said wireless interactive device is a member selected from the group consisting of cellular telephones, wireless personal digital assistants, wireless pocket PC's, and two-way pagers, said member being provided wireless access by said wireless service provider.

109. A system as recited by claim 76, wherein said wireless interactive device is Internet enabled and communicates therewith.

110. A system as recited by claim 76, wherein said wireless interactive device incorporates circuitry for receiving broadcast informational items and said system further comprises a broadcasting system broadcasting said informational items appointed to be received by said wireless interactive device.

111. A system as recited by claim 76, wherein said wireless communications system transmits and receives using at least one transmission form selected from the group consisting of radio transmission, microwave transmission, broadband wireless data transmission, ultra-wide band transmission, spread-spectrum transmission, and satellite transmission.

112. A system as recited by claim 76, wherein said user output interface bears at least one of said query directed to said participants and said results.

113. A system as recited by claim 76, wherein said means for processing comprises a central processor including at least one general-purpose computer.

114. A system as recited by claim 76, further comprising at least one distributed receiving server in data communication with said central processor and said wireless communications system, and wherein a computer program stored in said receiving server receives said wagers and transfers said wagers to said central processor.

115. A system as recited by claim 76, further comprising at least one visible display bearing at least one of said query directed to said participants and said results.

116. A system as recited by claim 115, wherein said visible display comprises a plurality of video monitors dispersed throughout said venue.

117. A system as recited by claim 115, wherein said visible display comprises a scoreboard visible to the participants in said venue.

118. A system as recited by claim 115, wherein said visible display comprises a large screen display visible to the participants in said venue.

119. A system as recited by claim 76, wherein a computer program stored in said central processor is operative to process into results said wagers entered by said participants.

120. A system as recited by claim 76, wherein said promotional message server employs demographic characteristics of said participants in selecting said promotional message.

* * * * *